United States Patent [19]

Newton

[11] Patent Number: 5,116,933
[45] Date of Patent: May 26, 1992

[54] AROMATIC POLYMER

[75] Inventor: Alan B. Newton, Lealholm, England

[73] Assignee: Imperial Chemical Industries PLC, London, England

[21] Appl. No.: 445,126

[22] Filed: Dec. 4, 1989

Related U.S. Application Data

[63] Continuation of Ser. No. 154,038, Feb. 9, 1988, abandoned.

[30] Foreign Application Priority Data

Feb. 10, 1987 [GB] United Kingdom ................ 8702993

[51] Int. Cl.$^5$ .................. C08G 8/02; C08G 14/00; C08G 65/38; C08G 75/00
[52] U.S. Cl. ....................... 528/125; 528/126; 528/128; 528/174; 528/175; 528/219
[58] Field of Search ............... 528/125, 126, 128, 219, 528/174, 175

[56] References Cited

U.S. PATENT DOCUMENTS

| | | | |
|---|---|---|---|
| 4,008,203 | 2/1977 | Jones | 528/175 |
| 4,108,837 | 8/1978 | Johnson | 528/126 |
| 4,175,175 | 11/1979 | Johnson | 528/125 |
| 4,176,222 | 11/1979 | Cinderey et al. | 528/125 |
| 4,320,224 | 3/1982 | Rose et al. | 528/126 |
| 4,339,568 | 7/1982 | Maresca | 528/126 |
| 4,446,294 | 5/1984 | Rose et al. | 528/125 |

FOREIGN PATENT DOCUMENTS 0113112  7/1984  European Pat. Off. .

OTHER PUBLICATIONS

Wu, S. D. et al., Polymer Preprints 26(2) (1985), pp. 277–280.

"The Synthesis of Two Dihydroxyterphenyls", Charles Price et al., The Noyes Chemical Laboratory, University of Illinois, pp. 632–633.

Attwood et al., "Synthesis and properties of polyaryletherketones", *Polymer*, 1981, vol. 22, Aug. pp. 1096–1103.

*Primary Examiner*—John Kight, III
*Assistant Examiner*—P. Hampton Hightower
*Attorney, Agent, or Firm*—Cushman, Darby & Cushman

[57] ABSTRACT

A crystalline polyarylether capable of being shaped into fibers or films or moulded or used as a matrix in composites, contains repeating units $Ph'_n$, $Ar^1$ and $Ar^2$ connected by ether linkages, wherein Ph' is 1,3 or 1,4-phenylene optionally substituted with 0 to 4 methyl or chloro groups, n is an integer from 1 to 4

$Ar^1$ is $Ph[CO[Ph'CO]_xPh]_y$ wherein x = 0 or 1 y = 1 or 2

Ph is 1,4-phenylene optionally substituted with 0 to 4 methyl or chloro groups, and $Ar^2$ is $[Ph_nSO_2]_vPh'_w$ wherein u, v and w are integers from 1 to 4; said units being in the relative molar proportions:

| | |
|---|---|
| $Ph'_n$ | 40 to 60% |
| $Ar^1$ | 92 to 50% of the total of Ar1 and Ar$^2$. |
| and $Ar^2$ | 8 to 48% of the total |

22 Claims, No Drawings

AROMATIC POLYMER

This is a continuation of Application Ser. No. 07/154,038, filed Feb. 9, 1988, which was abandoned upon the filing hereof Ser. No. 07/445,126.

The present invention relates to aromatic polymers, composite materials based on such polymers and the production of such polymers.

In many commercially available polymers of this type, aromatic rings are linked together by atoms or groups such as oxygen (ether), sulphur, sulphone, ketone or alkylene. Those containing ether and sulphone, and optionally alkylene, linkages are generally amorphous with high glass transition temperatures, for example over 200° C., in some cases at least 250° C. However, being amorphous, they are vulnerable to attack by a range of solvents, including hydrocarbon liquids.

In contrast, polymers containing ether and ketone linkages are generally crystalline or crystallisable and in crystalline form are resistant to attack by many chemical environments. They generally have a high melting temperature, typically at least 300° C., possibly over 400° C. However, the glass transition temperature of many polymers of this type is typically below 200° C. and may be in the range 140° C. to 160° C. Since an appreciable proportion of their mechanical strength is lost at temperatures around the glass transition temperature, these polymers are not suitable for applications which require the retention of mechanical properties such as modulus at temperatures of 180° C. or higher. If the polymer structure is modified in an attempt to increase the glass transition temperature, any such increase is usually accompanied by an increase in the melting temperature. Since, to avoid degradation, the polymer processing temperature is preferably at most 450° C., especially up to 430° C., the melting temperature of the polymer is preferably below 420° C., more preferably below 400° C. Few polymers possess a glass transition temperature of 180° C. or above together with a melting temperature below 420° C.

In the ensuing description the following abbreviations will be used:

DSC—differential scanning calorimetry;

Tm—melting point, the temperature at which the main peak of the melting endotherm is observed;

Tc—temperature at which crystallisation occurs on cooling the melt before or after solidification.

Tg—glass transition temperature

IV—inherent viscosity, as measured at 25° C. on a solution of 0.1 g of polymer in 100 cm$^3$ of solution in sulphuric acid of density 1.84 g/cm$^3$ IV = 10 l n Ts/To, where Ts and To are the flow times of solvent and solution respectively.

RV—reduced viscosity, as measured at 25° C. on a solution of 1.0 g of polymer in 100 cm$^3$ of solution in sulphuric acid of density 1.84 g/cm$^3$ RV = (Ts/To) − 1

The determination of Tg by DSC is carried out by examining a 10 mg sample of polymer in a Perkin Elmer DSC-4 and or DSC-7 instrument, using a heating rate of 20° C./min under nitrogen. From the resulting curve the onset of the Tg transition is obtained. This is measured as the intersection of lines drawn along the pre-transition baseline and a line drawn along the greatest slope obtained during the transition.

According to a first aspect of this invention a crystalline polyarylether capable of being shaped into fibres or films or moulded or used as a matrix in composites, contains repeating units $Ph'_n$, $Ar^1$ and $Ar^2$ connected by ether linkages, wherein Ph' is 1, 3 or 1, 4-phenylene optionally substituted with 0 to 4 methyl or chloro groups.

n is an integer from 1 to 4

$Ar^1$ is Ph [CO[Ph'CO]$_x$Ph]$_y$ wherein x = 0 or 1 y = 1 or 2

Ph is 1,4-phenylene optionally substituted with 0 to 4 methyl or chloro groups, and $Ar^2$ is [Ph$_n$SO$_2$]$_v$Ph'$_w$ wherein u, v and w are integers from 2 to 4; said units being in the relative molar proportions:

| | |
|---|---|
| Ph'$_n$ | 40 to 60% |
| Ar$^1$ | 92 to 50% of the total of Ar$^1$ and Ar$^2$. |

Consequently $Ar^2$ may lie in the range 8 to 48% of the total of $Ar^1$ and $Ar^2$. $Ar^1$ is preferably 60 to 92% of the total of $Ar^1$ and $Ar^2$ more preferably 70 to 92% of said total.

The relative proportions are by moles on the total of the three units in combination, ignoring any excess of any of them which may be included for the purpose of controlling molecular weight or providing particular end groups. In addition the polymer may contain up to 20 mole % of other ether-linkable units.

The proportion of the unit $Ph'_n$ is preferably 45 to 55%, more preferably 50%.

Unit $Ph'_n$ is preferably 4,4'-biphenylene or 4,4',4''-terphenylene. $Ph_n$ may to the extent of up to 60, especially up to 20, mole % be selected from other bis-phenylene units, especially of the type not containing electron-withdrawing groups para to ether linkages, for example diphenyl ether, diphenoxybenzene and diphenyl alkane especially diphenylpropane.

When Ph' and Ph are unsubstituted $Ar^1$ is a ketonic group that when ether-linked alternatingly with 1,4-dioxyphenylene units gives a poly(ether ketone) that at a molecular weight over 10000 is melt-crystallisable, has Tg over 139° C. and Tm under 420° C.

Examples of $Ar^1$ are

| |
|---|
| Ph' CO Ph' |
| Ph' CO Ph$^2$ CO Ph' |
| Ph' CO Ph' Ph' CO Ph' (with at least one other Ar1, to avoid over high Tm) |
| Ph' CO Ph' Ph' |

It is characteristic of units $Ar^2$ when Ph and Ph' are unsubstituted that the polymers in which they are linked alternatingly with 4,4'-dioxybiphenylene has a Tg over 210° C. at a molecular weight over 10000 and are amorphous insofar as the polymers cannot be crystallised by solely thermal means i.e. in the absence of a solvent. Examples of $Ar^2$ are

| |
|---|
| Ph SO$_2$ Ph |
| Ph SO$_2$ Ph Ph SO$_2$ Ph |
| Ph SO$_2$ Ph Ph SO$_2$ Ph Ph |
| Ph SO$_2$ Ph Ph Ph SO$_2$ Ph |

Polymers of this invention are characterised by one or more of (i) being 10–60% crystalline especially 15–40% after annealing; (ii) being tough when formed into an amorphous film by compression moulding and are preferably tough when formed into a crystalline film; (iii) being resistant to a wide range of solvents when crystalline, in particular being, on immersion for 24 hours in methylene chloride ($CH_2Cl_2$) at 20° C., "essentially unaffected", that is, not dissolving or becoming unworkably soft, and preferably gaining not more than 10% by weight; (iv) having a Tg of at least 180° C. quenched and at least 195° C. after annealing; and (v) having a Tm of below 400° C. Thus these polymers are particularly useful for applications which require resistance to solvents and to high temperatures.

Polymers in accordance with the invention can be melt processed into shaped articles, including films and insulating coatings on electrical conductors or used as matrices in composites. They can be used in applications for which polyethersulphones and/or polyaryletherketones have been proposed previously. In particular they may be used for bearings or bearing liners or for those applications which require a combination of one or more of good electrical insulating properties, good resistance to a wide range of chemicals, retention of mechanical properties up to high temperature, good resistance to burning and the emission of low proportions of toxic fumes and with low smoke density on burning. Films whether undrawn, uniaxially-drawn or biaxially-drawn are especially useful when made of these polymers.

Whilst for many applications the polymers of the invention may be used with few if any additives, other than stabilisers, additives may be incorporated for example inorganic and organic fibrous fillers such as of glass, carbon or poly-paraphenylene terephthalamide; organic fillers such as polysulphones, polyketones, polyimides, polyesters and polytetrafluorethylene at various levels of compatibility; and inorganic fillers such as graphite, boron nitride, mica, talc and vermiculite; nucleating agents; and stabilisers such as phosphates and combinations thereof.

Typically the total content of additives is 0.1 to 80%, especially at most 70% by weight of the total composition. The composition can contain for example 5 to 30% by weight of boron nitride; or at least 20% by weight of short glass or carbon fibre; or 50 to 70% especially about 60%, by volume of continuous glass or carbon fibre; or a mixture of a fluorine-containing polymer, graphite and an organic or inorganic fibrous filler and the total proportion of these additives is preferably 20 to 50% by weight of the total composition.

The composition may be made by mixing the polymer with the additives for example by particle or melt blending. More specifically the polymeric material, in the form of dry powder or granules, can be mixed with the additives using a technique such as tumble blending or high speed mixing. The blend thus obtained may be extruded into a lace which is chopped to give granules. The granules can be subjected to a forming operation, for example injection moulding or extrusion, to give a shaped article.

Alternatively the composition may be film, foil, powder or granules of the polymer with or without particulate additives, laminated with a fibrous filler in the form of mats or cloths.

Alternatively a composition containing fibrous filler may be obtained by passing essentially continuous fibre, for example glass or carbon fibre, through molten polymer or a mixture containing it in a dissolved or finely dispersed state. The product obtained is a fibre coated with polymer and may be used alone, or together with other materials, for example a further quantity of the polymer, to form a shaped article. The production of compositions by this technique is described in more detail in EP-A 56703, 102158 and 102159.

In the production of shaped articles from the polymers of the invention, or from polymer compositions containing them, desirably the crystallinity of the polymer is developed as far as possible during the fabrication process, including any annealing stage, because in subsequent use an article which can continue to crystallise can suffer dimensional changes, warping or cracking and general change in physical properties. Furthermore, increased crystallinity results in improved environmental resistance. It also can increase Tg significantly, providing an major or advance in heat-resistance.

If desired, for further improved crystallisation behaviour, polymers of the invention may be modified by forming, on the polymeric chains, terminal ionic groups-A-X, where A is an anion and X is a metal cation, as described in more detail in our EP-A 152161. The anion is preferably selected from sulphonate, carboxylate, sulphinate, phosphonate, phosphate, phenate and thiophenate and the metal cation is an alkali metal or alkaline earth metal. By such modification the temperature Tc for the onset of crystallisation, may be raised by at least 2° C. in comparison with a similar polymer not containing the ionic end-groups. However, useful polymers are obtained even when there is little or no change in Tc if sufficient nucleation results from the presence of end groups to increase the number of spherulites in comparison with a similar composition not containing the ionic end groups.

Such modified polymers are most suitably produced by reaction of a preformed polymer with reactive species containing the ionic group. For example, if the polymer has a terminal group selected from fluoro, chloro and nitro the reactive species contains a nucleophilic group such as a phenate or thiophenate or a group of formula-A-X.

Modified polymers containing terminal ionic groups may be used alone or in a blend with unmodified polymers.

The polymers may in principle be made by an electrophilic process but are most suitably made by a nucleophilic process in which halides and phenols corresponding to the specified repeating units are polycondensed together in presence of one or more bases. In particular the following combinations may be used, simply or in combination (Y is halogen, especially Cl or F):

| | Source of unit | | |
|---|---|---|---|
| | I | II | III (n = 1 to 4) |
| (i) | HOPhPhOH | YPhCOPhY | $YPhSO_2Ph_nSO_2PhY$ |
| (ii)* | YPhPhY | HOPhCOPhOH | $HOPhSO_2Ph_nSO_2PhOH$ |
| (iii)* | YPhPhOH | YPhCOPhOH | $YPhSO_2Ph_nSO_2PhOH$ |
| (iv) | HOPhPhOH | YPhCOPhPhOH | $YPhSO_2PhY$ |

Further, any of these units can be introduced in the form of a polymer with any of the others, possibly as a residue left over in the reactor from a previous polycondensation leading to a polymer of the same structure or a structure tolerable as a blend or impurity. In any of these systems involving a haloaromatic reactant a copper catalyst can be used; in those marked * a copper catalyst must be used since a halide reactant having no activating group is present. The base is preferably at least one alkali metal hydroxide or carbonate, carbonate being suitably introduced as bicarbonate.

The molecular weight of the polymer obtained can be controlled by using an excess quantity of halogen or —OH as above-mentioned, and alternatively or additionally by including in the reaction mixture a small proportion, for example less than 5% mole, and especially less than 2% mole relatively to the monomers and/or the polyarylethersulphone, of a monofunctional compound such as a phenol or, preferably, an activated arylmonohalide.

The polycondensation reaction may be carried out in the presence or absence of a solvent.

Preferably a solvent is employed and is an aliphatic or aromatic sulphoxide or sulphone of the formula $$R-SO_a-R'$$

where a is 1 or 2; and

R and R', which may be the same or different, are alkyl or aryl groups, and may together form a divalent radical.

Solvents of this type include dimethyl sulphoxide, dimethyl sulphone, and sulpholane (1,1-dioxothiolan) but the preferred solvents are aromatic sulphones of the formula

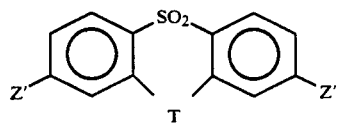

where

T is a direct link, oxygen or two hydrogens (one attached to each benzene ring); and Z and Z', which may be the same or different, are hydrogen or alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl. Diphenylsulphone is preferred. Other solvents that may be used are to be found among that class classified as dipolar and aprotic, for example N-methyl-2-pyrrolidone. In addition co-solvents and diluents may be present. An azeotrope may be used to remove water from the reaction mixture.

The proportion of solvent used is typically such that the content of polymer and polycondensable material present is in the range 15-25% by weight, it need not all be in solution, and it may be advantageous to operate such that polymer separates as it is formed.

In the polycondensation reaction mixture, if an alkali metal hydroxide is used, this is preferably pre-reacted with the halophenol or bisphenol. The resulting phenate should preferably be in a finely divided form, for example having a particle size of less than 1.0 preferably less than 0.5 mm more preferably less than 0.1 mm. The phenate is conveniently formed in aqueous or methanolic solution and, since the polycondensation should be effected in the essential absence of —OH containing compounds such as water and alcohols, it is necessary to remove such compounds prior to effecting the polycondensation. Thus the halophenol or bisphenol may be stirred in a solution of alkali metal hydroxide in water or a 90:10 by volume mixture of methanol and water, preferably in the ratio of 1 mole of phenol groups to at least one mole of hydroxide, until it has dissolved; then the solvent may be evaporated off, for example by spray drying. Any hydrated phenate obtained is preferably dehydrated for example by evaporation under reduced pressure, or by heating, preferably in the presence of a diaryl sulphone, at above 150° C., preferably above 200° C. and preferably under partial vacuum, e.g. 25 to 400 torr. A particular advantage in dehydration of the phenate in the presence of a diaryl sulphone in the polycondensation vessel is that, because the diaryl sulphone does not boil, there is no splashing of the phenate on the walls of the reaction vessel and hence stoichiometry of the polycondensation reaction is maintained. Any dihalo-benzenoid monomers to be used in the polycondensation can be added after evolution of water has ceased, for example as indicated by cessation of foaming. After removal of the water, and addition of any necessary dihalo-benzenoid monomers and/or additional base, the temperature is increased to the polycondensation temperature.

If the base is an alkali metal carbonate added as such or as bicarbonate, whether for the whole base requirement or as an addition to the phenate, it is preferably anhydrous. However, if hydrated it may be dehydrated during heating up to the polycondensation temperature if that temperature is high enough.

The condensation agent may comprise one or more alkali or alkaline earth carbonates. In this specification it is to be understood that bicarbonates may be employed in addition to or in place of carbonates.

Generally a mixture containing an alkali or alkaline earth carbonate and a higher alkali carbonate is preferred. The higher alkali carbonate may be potassium carbonate although the caesium or rubidium salts may be employed. The alkali or alkaline earth carbonate may comprise sodium carbonate, lithium carbonate or other alkaline earth carbonates or mixtures thereof. Mixtures may also include a minor proportion of the higher alkali carbonate, the latter serving to activate the larger proportion of lower alkaline earth carbonates. Use of such mixtures is disclosed in GB 1586972. Use of lithium carbonate in admixture with potassium carbonate is illustrated in U.S. Pat. No. 4,636,557.

Sole use of a higher alkali carbonate or use of a relatively high proportion of the latter allows use of cheaper but less reactive chloromonomers, particularly chloro-sulphones. Sole use of potassium carbonate or caesium carbonate or mixtures thereof has been found to be particularly efficacious.

The base is desirably used in a finely divided form since we have found that with coarse materials the product obtained may have a lower IV. The base or mixture of bases may also be milled to reduce particle size and increase surface area prior to use.

In order to achieve a satisfactory molecular weight the alkali metal hydroxide, carbonate or bicarbonate should be used preferably in excess over the stoichiometric proportion, the excess being particularly in the range 1 to 15%, for example 2%, molar.

The polycondensation may also be conducted in the presence of an additional salt or salts especially where the cation comes from Group IA or IIA of the Periodic Table and especially where anion is a halide, an aryl sulphonate a carbonate, a phosphate, a borate, a benzoate, a terephthalate or carboxylate. Such salts may be generated or added, at any stage of the polycondensation.

If a copper containing catalyst is used the copper is preferably not more than 1%, preferably less than 0.4%, but desirably at least 0.01%, molar with respect to the monomers. A wide range of materials may be used, cupric and cuprous compounds and also metallic copper and suitable alloys being usable to introduce the copper containing catalyst. Preferred copper compounds are essentially anhydrous and include cuprous chloride, cupric chloride, cupric acetylacetonate, cuprous acetate, cupric hydroxide, cupric oxide, basic cupric carbonate, basic cupric chloride and particularly cuprous oxide. Catalysis by copper is described in more detail in our EP-A 182648 published May 28, 1986 and British application 8527756 filed Nov. 11, 1985. Nov. 1985. The stoichiometric excess of the alkali metal hydroxide, carbonate or bicarbonate is calculated after allowing for reaction with the copper compound if it is a salt of a strong acid and disregards any basicity of the copper compound.

If the polycondensation is effected in the presence of a copper containing catalyst, removal of copper residues from the polymer at the completion of the polymerisation is very desirable. Especially if the polymer has been efficiently end-capped, for example with 4,4'-dichlorodiphenylsulphone, the residues may be removed using a complexing agent such as ethylenediamine tetraacetic acid and thereafter washing the polymer with water or a mixture of water and methanol.

The polycondensation reaction is carried out at least 150° C., preferably in the range 250° C. to 400° C., particularly 280° C. to 350° C. An increase in reaction temperatures leads to shorter reaction times but with risk of product decomposition and/or side reactions whereas a decrease in reaction temperature leads to longer reaction times but less product decomposition. However a temperature should be used which maintains the polymer at least partly in solution. In general the solubility of polymer in the polycondensation solvent, for example a diaryl sulphone, increases with temperature. Solubility also increases with increasing proportion of sulphone groups in the polymer chain, hence polymers having a higher proportion of sulphone groups can, if desired, be produced at slightly lower polymerisation temperatures. It has been found that better results are obtained if after melting the reactants, the temperature is increased to the polycondensation temperature over several hours.

In order to obtain products of improved properties, it may be advantageous to use a prepolycondensation stage in which the monomers are heated together at a temperature at which some oligocondensation occurs but little, if any, polycondensation occurs. Such prepolycondensation can be effected at 200° C. to 250° C., particularly 220° C. to 245° C. The prepolycondensation is believed to result in the formation of relatively involatile oligomers and hence to reduce the possibility of volatile monomers being removed from the reaction mixture.

When the nucleophilic route is used to make the products of the invention it is advantageous to generate poly(ethersulphone) segments or oligomers during the initial stages of the polycondensation at a faster rate than poly(ether ketone) segments. This procedure minimises the formation of stable foams permitting faster polycondensation and leads to more reproducible molecular weights. The early production of poly(ethersulphone) segments may be ensured by the choice of dihalo monomers or by delaying the addition of the ketonic monomer e.g. 4,4'-dihalobenzophenone, in total or in part, until substantial amounts of poly(ethersulphone) segments have been produced. Thus, when 4,4'-difluorodiphenylsulphone and 4,4'-difluorobenzophenone are used, the monomers may be charged simultaneously since the sulphone group is a more powerful activating group than the ketone. If it is desired to obtain essentially the same product as above by using the much less expensive 4,4'-dichlorodiphenyl sulphone, the addition of the 4,4'-difluorobenzophenone may be delayed until the initial reagents have been allowed to react to a convenient extent which may lie in the range 5-95% as judged by the evolution of carbon dioxide.

The polycondensation is preferably carried out in an inert atmosphere, for example argon or nitrogen. The reaction vessel can be made from glass but for operation on a large scale is preferably made from stainless steels- (other than those which undergo surface crazing at the reaction temperatures in the presence of alkali metal halide), or made of, or lined with, titanium, nickel or an alloy thereof or some similarly inert material.

To neutralise any reactive oxygen-containing anions, a reagent therefor may be introduced into the polycondensation reaction. Reactive monofunctional halides, for example methyl chloride, and reactive aromatic halides such as, for example, 4,4'-dichlorodiphenylsulphone, 4,4'-dichloro-benzophenone, 4-chlorodiphenylsulphone or 4-chloro-benzophenone are particularly suitable.

At the completion of polycondensation, the reaction mixture may be (i) allowed to cool and, depending on the polycondensation solvent, to solidify, (ii) ground, (iii) treated to remove any polymerisation solvent, for example by extraction with a solvent therefor, conveniently a mixture of acetone or an alcohol for example methanol, then with water to remove the salts, and finally (iv) dried. Additionally, the polymer may be treated to remove copper residues.

Use of the biphenols, HO Ph$_{1-3}$ OH, to the exclusion of activated biphenols e.g. Bis-S, is preferred in production of polymers of this invention. Polymers not derived from large proportions of activated bisphenols have been found to be more easily washed free from inorganic salts. A minor proportion of activated bisphenols may be employed without unduly detracting from the ease of washing. Absence of activated bisphenol monomers or residues in the partially or wholly formed polymers reduces or eliminates the products resultant from ether scrambling reactions, facilitating control of the properties of the polymers. Furthermore inclusion of biphenylene or terphenylene groups in Ph$'_n$ usefully reduces the incidence of ether scrambling.

The polymers of this invention are very highly crystalline as made. This crystallinity is lost on melting and amorphous products may be made by quenching thin specimens into cold water. Crystallinity may be restored by slowly cooling the melt, at about 20° C./min, or by annealing at a temperature between Tg and Tm. The products of this invention are conveniently annealed at 300° C. for 90 minutes.

Crystallinity may be assessed by several methods for example by density, by ir spectroscopy, by X ray diffraction or by DSC. The DSC method has been used to evaluate the crystallinity that developed in samples annealed at 300° for 90 mins in a nitrogen atmosphere. A heating rate of 20° C./min was used until a temperature of 450° C. was attained. A baseline was then constructed under the melting endotherm and the enclosed area used to calculate the heat of fusion of the sample in joules/g. Assuming a heat of fusion of 130 joules/g for the crystalline material present, which could be in error by as much as 20%, the degree of crystallinity was calculated.

We refer to degress of crystallinity of:
30% or above as very highly crystalline
20% as highly crystalline
10% as crystalline
below 10% as slightly crystalline At least 10% crystallinity is required for useful products to be made, that is products with enhanced solvent resistance, but values of at least 20% are preferred.

When the toughness of the polymers is to be determined, the test most frequently used consists in compression-moulding a film about 0.3 mm thick from a sample of the polymer at a temperature at least 40° C. above the polymer melting point in a press (4400 MN/m² for 5 minutes), then either cooling the film slowly to induce complete crystallisation or else quench cooling and annealing it to induce the requisite crystallisation. The film is flexed through 180° to form a crease, whereby the two faces of the film formed about the crease touch. The film is compressed manually to form the crease line. If the film survives this treatment without breaking (e.g. snapping or tearing) it is deemed to be tough; if it fails on the formation of the crease, it is deemed to be brittle and if it fails during the test it is regarded as moderately tough.

The invention is illustrated by the following Examples.

EXAMPLE 1

Units I, II and III in ratio 50:40:10, n=2

A cylindrical glass reactor fitted with a horseshoe shaped stirrer was charged with:
A 52.14 g (0.280 mol) of 4,4'-dihydroxybiphenyl
B 51.32 g (0.235 mol) of 4,4'-difluorobenzophenone
C 28.18 g (0.056 mol) of 4,4'-bis(4-chlorophenylsulphonyl)biphenyl and
D 437 g of diphenylsulphone The reactor was purged with nitrogen and the above components melted together using an oil bath at 140° C. The stirrer was started and 39.47 g (0.286 mol) of anhydrous potassium carbonate, previously sieved through a 300 micron sieve, was slowly added to the melt. The temperature of the oil was raised to 300° C. at a linear rate over the next 10 hours. Carbon dioxide and water were expelled and were prevented from returning to the polycondensation. A further 5 g of C was added 9.5 hours after the carbonate had been added.

The viscous reaction mixture was cooled and milled to give a granular product which was then extracted with acetone followed by extraction with hot water. The polymeric product was found to have an IV of 0.74 indicating a high molecular weight. A sample of the polymeric product was compression moulded at 430° C. to give a foil 0.33 mm thick using a heated press. On quenching into cold water a transparent and amorphous specimen was obtained which could be creased without fracture and which was found to exhibit a single Tg of 185° C. when examined by DSC. DSC examination showed that this polymer crystallises readily from the melt.

A sample of the compression moulding was crystallised by annealing at 300° C. for 1.5 h under nitrogen. It was now opaque and showed a single Tg of 207° C., increase of 22° C. The crystal melting point was 399° C. and the heat of fusion indicates that the degree of crystallinity is high. After 24 hours immersion in dichloromethane, the annealed specimen increased in weight by only 2%, confirming a high degree of crystallinity.

EXAMPLES 2-6

Using the components and the method described for Example 1, a number of other polymers were made:

| Example | Mol % III | IV | Tg °C. Quenched | Tg °C. Annealed |
| --- | --- | --- | --- | --- |
| 1 | 10 | 0.74 | 185 | 207 |
| 2 | 5 | 0.42 | 174 | 199 |
| 3 | 12.5 | 0.78 | 200 | 218 |
| 4 | 15 | 0.66 | 203 | 217 |
| 5 | 20 | 0.77 | 210 | 222 |
| 6 | 25 | 0.90 | 228 | 228 |
| Comparative | 0 | 1.2 | 167 | 169 |

The crystallinity was also assessed in annealed specimens, by DSC and by dichloromethane uptake. Compositions containing 25 mol % or more of C showed little crystallisation if any on annealing: the composition given in Example 6 took up 60 wt % of dichloromethane. An amorphous foil made using the polymer of Example 3 was uniaxially drawn by a factor of 3.0 at 200°–215° C. and then annealed under restraint up to 320° C. A wide angle X ray diffraction pattern was recorded. This record showed the same features as that of an oriented and annealed specimen derived from the Comparative Example.

EXAMPLE 7

A polymer was made as in Example 3 except that 4,4'-bis(4-chlorophenylsulphonyl)terphenyl replaced component C on a molar basis. This product has an IV of 0.95 and also could be readily crystallised from the melt. The Tg of quenched and annealed specimens was 209° and 221° C. respectively.

EXAMPLE 8

This preparation was as in Example 4 except that 5.0 mol % of the potassium carbonate was replaced by a similar molar amount of anhydrous cesium carbonate. This product had an IV of 0.94, crystallised from the melt and the Tg of quenched and annealed specimens was 199° and 221° C. respectively.

EXAMPLE 9

This preparation was as in Example 3 except that component C was replaced by an equivalent amount of 4,4'-dichlorodiphenylsulphone. This product had an IV of 0.81. This product crystallised rapidly from the melt and the Tg of quenched and annealed specimens was 175° and 193° C. respectively, an annealed specimen took up 2.0 wt % dichloromethane after 24 hours immersion.

EXAMPLE 10

A stainless steel vessel was purged with nitrogen and charged with components A–D of Example 1 in the following quantities
A 14.894 kg (50 mole %)
B 11.521 kg (33 mole %)
C 14.091 kg (17 mole %)

D 112 kg

When melted, an agitator was run at 100 rpm and 11.278 kg of finely divided anhydrous potassium carbonate slowly added. The vessel was then closed and gradually heated to 320° C. over nine hours 150 g of component C was then added and after a further 30 minutes, the product was then cast onto a water cooled band. The product was then milled to a granular powder and leached as described in Example 1.

This product had an IV of 0.76 and crystallised from the melt on cooling at 20° C./min. The Tg of a quenched specimen was 207° C. and this rose to 222° C. on annealing at 300° C. for 1.5 hours.

In this run some separation of polymer occurred; and this was confirmed by the observation that the product was fully soluble in diphenyl sulphone at polycondensation strength at 340° C. but incompletely to at 320° C.

EXAMPLE 11

A cylindrical glass reactor fitted with horseshoe shaped stirrer was charged with:
52.14 g (0.280 mol) of 4,4'-dihydroxybiphenyl
25.33 g (0.0882 ml) of 4,4'-dichlorodiphenylsulphone
282 g of diphenylsulphone The reactor was then purged with nitrogen and the above components melted together at 180° C. under a slow stream of nitrogen. The mixture was then stirred at 148 rpm and 39.47 g (0.2856 mol) of anhydrous potassium carbonate, previously sieved to pass a 300 micron sieve, was added over 10 minutes. The temperature was then raised to 220° C. uniformly over the next 2 hours. During this period about 0.04 mol of carbon dioxide was evolved (about 14% of that available). of 4,4'-difluorobenzophenone (42.77 g) was then added, the reaction heated to 330° C. over the next 2 hours and then held at 330° C. for 2 hours and then held at 330° for 2 hours. Attempts to polycondense all the components at a higher heating rate resulted in excessive foaming at 190° C.

The viscous mixture was cooled and polymer isolated as described in Example 1. The resulting polymer had an RV of 1.51. A tough, transparent amorphous specimen was prepared as described in Example 1 and found to have a Tg of 185° C. This rose to 200° C. after annealing and crystallising at 300° C. for 1.5 hrs. The melting process of the annealed foil indicated a high degree of crystallinity and this foil absorbed 5% of methylene chloride after 24 hrs immersion at room temperature.

EXAMPLE 12

The following components were charged to a glass flask and purged with nitrogen:

| | |
|---|---|
| 4,4'-dibromobiphenyl | 9.45 g |
| 4,4'-dihydroxybenzophenone | 4.88 g |
| Sodium bicarbonate | 5.60 g |
| 4,4'-dihydroxydiphenylsulphone | 1.80 g |
| Cuprous bromide | 0.24 g |
| Diphenylsulphone | 40.00 g |

The temperature was raised to 200° C. and held at this temperature for 30 minutes followed by a period of 6 hours at 340° C. The polymer was isolated as described in Example 1 except that the water washing stage was preceded by a wash with an aqueous solution of the disodium salt of ethylenediaminetetraacetic acid (EDTA) to remove copper salts.

The product had an IV of 1.0 and was found to be substantially crystalline when examined by DSC with a Tg of 181° C. and a melting point of 362° C. A solution of this polymer was made in concentrated sulphuric acid and after 24 hours at room temperature the $^{13}$C nmr spectrum recorded. This spectrum was almost indistinguishable from that of the polymer described in Example 9.

EXAMPLE 13

A polymer was made as described in Example 11 using:

| | | |
|---|---|---|
| 4,4'-dihydroxybiphenyl | 32.14 g, | 0.280 mol |
| 4,4'-dichlorodiphenylsulphone | 34.17 g, | 0.119 mol |
| Diphenylsulphone | 285.5 g, | | followed by anhydrous potassium carbonate (39.47 g 0.286 mol) and finally after about 0.04 mol of carbon dioxide had appeared, 4,4'difluorobenzophenone (36.66 g 0.168 mol) was added. This polymer had an RV of 1.19. An amorphous film approximately 100 mm×80 mm×0.40 mm was prepared as described in Example 1 and was found to exhibit a single Tg of 190° C. when examined by DSC. Ten rectangular specimens each 50 mm×14 mm cut from the film were annealed at 270° C. for 1½ hours in air. Each specimen was centrally notched on the long edge with a "Vee" notch of 10 micron tip radius to a depth of 4 mm. Each specimen was tested in tension at a rage of 6 mm/minute and tearing rather than catastrophic failure was seen to occur at the notch. An estimate of the toughness was made by calculating the ratio:

Energy absorbed to break/ligament area. The average value was found to be 36.6 KJ m$^{-2}$. A fractured specimen was subsequently examined by DSC analysis and found to be substantially crystalline with a Tg on set of 199° C. and a large melting endotherm at 362° C. Immersion in dichloromethane for 24 hours produced an 11.0% increase in weight.

EXAMPLE 14

The following components were accurately weighed into a glass reactor:

| | | |
|---|---|---|
| 4,4'-dihydroxybiphenyl | 46.56 g | 0.250 mol |
| 4,4'-dihydroxydiphenylsulphone | 7.51 g | 0.030 mol |
| 4,4'-difluorobenzophenone | 46.43 g | 0.213 mol |
| 4,4' bis(4-chlorophenylsulphonyl)biphenyl | 34.46 g | 0.078 mol |
| Diphenylsulphone | 443 g | |

The reactor was then purged with nitrogen, the contents melted at 185° C. and stirring started. 39.47 g of finely divided anhydrous potassium carbonate (0.286 mol) was slowly added, under nitrogen, over several minutes and the temperature raised to 320° C. over six hours. The temperature was held at 320° C. for a further 90 minutes and the polymer isolated as in Example 1.

This material was found to have an RV of 1.24 and the Tg of an amorphous sample was found to be 206° C. This material did not crystallise on cooling the melt at 10° C./min but did crystallise on annealing at 300° C. to give a tough film with a Tg of 210° C.

EXAMPLE 15

A polymer was made as described in Example 1 using the following recipe:

| 4,4'-dihydroxybiphenyl | 69.83 g | 0.375 cm³ |
| 4,4'-difluorobenzophenone | 61.37 g | 0.281 mol |
| 4,4'-difluordiphenylsulphone | 25.73 g | 0.101 mol |
| Diphenylsulphone | 544 g | |
| Anhydrous sodium carbonate | 39.75 g | 0.375 mol |
| Anhydrous potassium carbonate | 1.04 g | 0.008 mol |

This polymer had an RV of 1.25 and also gave a tough film in the amorphous and crystalline states.

I claim:

1. A crystalline polyarylether insoluble in methylene chloride, having Tg (quenched) at least 185° C. and Tg (annealed) at least 195° C., and capable of being shaped into fibres or films or molded or used as a matrix in composites, which polyarylether consists essentially of the repeating units $Ph'_n$, $Ar^1$ and $Ar^2$ in the relative molar proportions:

$Ph'_n = 40$ to 60 percent; and
$Ar^1 = 92$ to 50 percent of the total of $Ar^1$ and $Ar^2$; wherein:

$Ph'_n$ is 1,3 or 1,4 phenylene optionally substituted with up to 4 methyl or chloro groups and n is an integer from 1 to 4;

$Ar^1$ is $Ph[CO[Ph'CO]_xPh]_y$
wherein Ph is 1,4 phenylene optionally substituted with up to 4 methyl or chloro groups;
x is 0 or 1; and
y is 1 or 2; and
$Ar^2$ is selected from the group consisting of

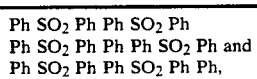

| Ph SO₂ Ph Ph SO₂ Ph |
| Ph SO₂ Ph Ph SO₂ Ph and |
| Ph SO₂ Ph Ph SO₂ Ph Ph, | and wherein said repeating units $Ph'_n$, $Ar^1$ and $Ar^2$ are connected by ether linkages.

2. A crystalline polyarylether insoluble in methylene chloride, having Tg (quenched) at least 185° C. and Tg (annealed) at least 195° C., and capable of being shaped into fibres or films or molded or used as a matrix in composites, which polyarylether consists essentially of the repeating units $Ph'_n$, $Ar^1$ and $Ar^2$ in the relative molar proportions:

$Ph'_n = 40$ to 60 percent; and
$Ar^1 = 92$ to 50 percent of the total of $Ar^1$ and $Ar^2$; wherein:

$Ph'_n$ is 1,3 or 1,4 phenylene optionally substituted with up to 4 methyl or chloro groups and n is an integer from 2 to 4;

$Ar^1$ is $Ph[CO[Ph'CO]_xPh]_y$
wherein Ph is 1,4 phenylene optionally substituted with up to 4 methyl or chloro groups;
x is 0 or 1; and
y is 1 or 2; and
$Ar^2$ is selected from the group consisting of

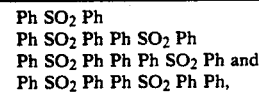

| Ph SO₂ Ph |
| Ph SO₂ Ph Ph SO₂ Ph |
| Ph SO₂ Ph Ph Ph SO₂ Ph and |
| Ph SO₂ Ph Ph SO₂ Ph Ph, | and wherein said repeating units $Ph'_n$, $Ar^1$ and $Ar^2$ are connected by ether linkages.

3. A polyarylether as claimed in claim 1 wherein the proportion of $Ar^1$ is 70 to 92% of the total of $Ar^1$ and $Ar^2$.

4. A polyarylether as claimed in claim 1, wherein $Ph'_n$ is selected from 4,4'-biphenylene and 4,4',4'''-terphenylene with up to 60 mol % of other bis-phenylene units.

5. A polyarylether as claimed in claim 4, wherein $Ph'_n$ is selected from 4,4'-biphenylene and 4,4',4'''-terphenylene with up to 20 mol % of other bisphenylene units.

6. A polyarylether as claimed in claim 1, wherein $Ar^1$ is a unit which when ether-linked alternatingly with 1,4-dioxyphenylene units gives a polyetherketone which at a molecular weight over 1000° is melt-crystallisable, has Tg over 139° C. and Tm under 420° C.

7. A polyarylether as claimed in claim 6, wherein $Ar^1$ is selected from: Ph CO Ph, Ph CO Ph' CO Ph and Ph CO Ph₂.

8. A polyarylether as claimed in any preceding claim wherein $Ar^2$ is a unit which when ether-linked alternatingly with 1,4-dioxyphenylene units gives an amorphous polyethersulphone which at a molecular weight over 10000 has Tg over 210° C.

9. A process for preparation of a crystalline polyaryether which comprises polycondensing under substantially anhydrous conditions in the presence of base, at least one compound of the formula $$Y'Ph'_nY^2$$

at least one compound of the formula $$Y^3Ar^1Y^4$$

and at least one compound of the formula $$Y^5Ar^2Y^6$$

wherein Ph', n, $Ar^1$ and $Ar^2$ are as hereinbefore defined and Y', $Y^2$, $Y^3$ and $Y^4$ are each independently a halogen atom or —OH group, and wherein the proportions of said compounds and the halogen atoms and —OH groups are substantially equimolar amounts, said compounds being in the relative molar proportions:

| Y' PH'$_n$ Y² | 40 to 60% |
| Y³ Ar¹ Y⁴ | 92 to 50% of the total of Y³ Ar¹ Y⁴ and Y⁵ Ar² Y⁶ |
| Y⁵ Ar² Y⁶ | 8 to 50% of the total of Y³ Ar¹ Y⁴ and Y⁵ Ar² Y⁶. |

10. A process as claimed in claim 9, wherein said proportion of Y' $Ph'_n$ Y² is 45 to 55%.

11. A process as claimed in claim 9 wherein the proportion of Y³ Ar¹ Y⁴ is 70 to 92% of the total of Y³ Ar¹ Y⁴ and Y⁵ Ar² Y⁶.

12. A process as claimed in any of claim 9 including the steps of:
forming polyarylethersulphone segments or oligomers by condensation of the compounds of formulae Y' Ph'n Y² and Y⁵ Ar² Y⁶
and reacting said segments or oligomers with said compound of formula Y³ Ar¹ Y⁴.

13. A process as claimed in any of claim 9, including the step of annealing the product of the polycondensation reaction.

14. A polyarylether as claimed in claim 2 wherein the proportion of $Ar^1$ is 70 to 92% of the total of $Ar^1$ and $Ar^2$.

15. A polyarylether as claimed in claim 2, wherein $Ph'_n$ is selected from 4,4'-biphenylene and 4,4',4'''-terphenylene with up to 60 mol % of other bis-phenylene units.

16. A polyarylether as claimed in claim 15, wherein $Ph'_n$ is selected from 4,4'-biphenylene and 4,4',4'''-terphenylene with up to 20 mol % of other bisphenylene units.

17. A polyarylether as claimed in claim 1, wherein $Ar^1$ is a unit which when ether-linked alternatingly with 1,4-dioxyphenylene units gives a polyetherketone which at a molecular weight over 10000 is melt-crystallisable, has Tg over 139° C. and Tm under 420° C.

18. A polyarylether as claimed in claim 17, wherein the unit $Ar^1$ is selected from: Ph CO Ph, Ph CO Ph' CO Ph, Ph CO $Ph_2$ CO Ph and Ph CO $Ph_2$.

19. A polyarylether as claimed in claim 2, wherein $Ar^2$ is a unit which when ether-linked alternatingly with 1,4-dioxyphenylene units gives an amorphous polyethersulphone which at a molecular weight over 10000 has Tg over 210° C.

20. A polyether as claimed in claim 2, wherein the unit $Ar^2$ is selected from:

| |
|---|
| Ph $SO_2$ Ph, Ph $SO_2$ $Ph_2$ $SO_2$ Ph, Ph $SO_2$ $Ph_2$ $SO_2$ $Ph_2$ and Ph $SO_2$ $Ph_3$ $SO_2$ Ph. |

21. A polyarylether as claimed in claim 1, wherein the polyarylether is 10–60% crystalline and has a Tm under 400° C.

22. A polyarylether as claimed in claim 1 in which $Ph'_n$ is Ph Ph, $Ar^1$ is Ph CO Ph and $Ar^2$ is selected from the group consisting of Ph $SO_2$ Ph, Ph $SO_2$ Ph Ph $SO_2$ Ph and Ph $SO_2$ Ph Ph Ph $SO_2$ Ph.

* * * * *